United States Patent [19]

Gelenius et al.

[11] 4,262,236
[45] Apr. 14, 1981

[54] COMMUTATORLESS DIRECT CURRENT MOTOR DRIVE SYSTEM

[75] Inventors: Robert B. Gelenius, Davison; Robert H. Wind, Grand Blanc, both of Mich.

[73] Assignee: General Motors Corporation, Detroit, Mich.

[21] Appl. No.: 29,312

[22] Filed: Apr. 11, 1979

[51] Int. Cl.³ .......................................... H02P 6/02
[52] U.S. Cl. .............................. 318/138; 318/254; 318/439
[58] Field of Search ..................... 318/138, 254, 439

[56] References Cited

U.S. PATENT DOCUMENTS

| | | |
|---|---|---|
| 1,976,463 | 9/1934 | Sabbah . |
| 2,644,916 | 7/1953 | Alexanderson et al. . |
| 3,304,481 | 7/1964 | Saussece . |
| 3,569,806 | 3/1971 | Brailsford ........................ 318/138 |
| 3,611,081 | 10/1971 | Watson ............................. 318/138 |
| 4,162,435 | 7/1979 | Wright ............................. 318/254 |

Primary Examiner—J. V. Truhe
Assistant Examiner—John W. Redman
Attorney, Agent, or Firm—Richard G. Stahr

[57] ABSTRACT

A commutatorless direct current motor drive system that initiates rotation of a permanent magnet rotor from standstill upon the application of supply potential and then sustains rotor rotation by sequentially energizing the polyphase stator phase windings in response to the alternating current potential waveforms induced in the stator phase windings by the magnetic field of the permanent magnet rotor upon rotor rotation.

5 Claims, 2 Drawing Figures

Fig.1

COMMUTATORLESS DIRECT CURRENT MOTOR DRIVE SYSTEM

This invention is directed to a drive system for commutatorless direct current motors of the type having a permanent magnet rotor and polyphase stator phase windings and, more specifically, to a drive system of this type that initiates permanent magnet rotor rotation from standstill upon the application of supply potential and sustains rotor rotation by sequential energization of the polyphase stator phase windings in response to the phase displaced alternating current potential waveforms induced in the stator phase windings upon rotor rotation.

Commutatorless direct current electric motors are well known in the art. Typically, these motors have a permanent magnet rotor that is magnetized with alternate magnetic poles across the rotor diameter and a polyphase stator having a plurality of phase windings that may be individually energized by an applied supply potential source. To sustain rotor rotation, the stator phase windings are sequentially energized to produce a rotating magnetic field. Motors of this type, therefore, require a method for determining rotor position so that the individual stator phase windings may be sequentially energized at the proper time relative to rotor position. Typically, optical devices, Hall effect devices or high frequency energized transformers are employed to detect rotor position and produce switch signals at the proper rotor positions to sequentially energize the stator phase windings in a manner to sustain rotor rotation. As these rotor position sensing devices require provisions for mounting them on the motor and present maintenance problems, a commutatorless direct current motor drive system that does not require rotor position sensing devices is desirable.

It is, therefore, an object of this invention to provide an improved commutatorless direct current motor drive system.

It is another object of this invention to provide an improved commutatorless direct current motor drive system that is capable of initiating rotor rotation from standstill upon the application of supply potential and sustaining rotor rotation after start.

It is an additional object of this invention to provide an improved commutatorless direct current motor drive system that provides for the sequential energization of the phase windings of a polyphase stator in response to the phase displaced alternating current potential waveforms induced in the stator phase windings by the magnetic field of the permanent magnet rotor upon rotor rotation.

In accordance with this invention, a commutatorless direct current motor drive system is provided wherein the polyphase stator phase windings of the motor are individually energized in sequence by an applied supply potential source in response to the phase displaced alternating current potential waveforms induced in the stator phase windings by the magnetic field produced by a permanent magnet rotor upon rotor rotation.

For a better understanding of the present invention, together with additional objects, advantages and features thereof, reference is made to the following description and accompanying drawing in which.

Figure 1:
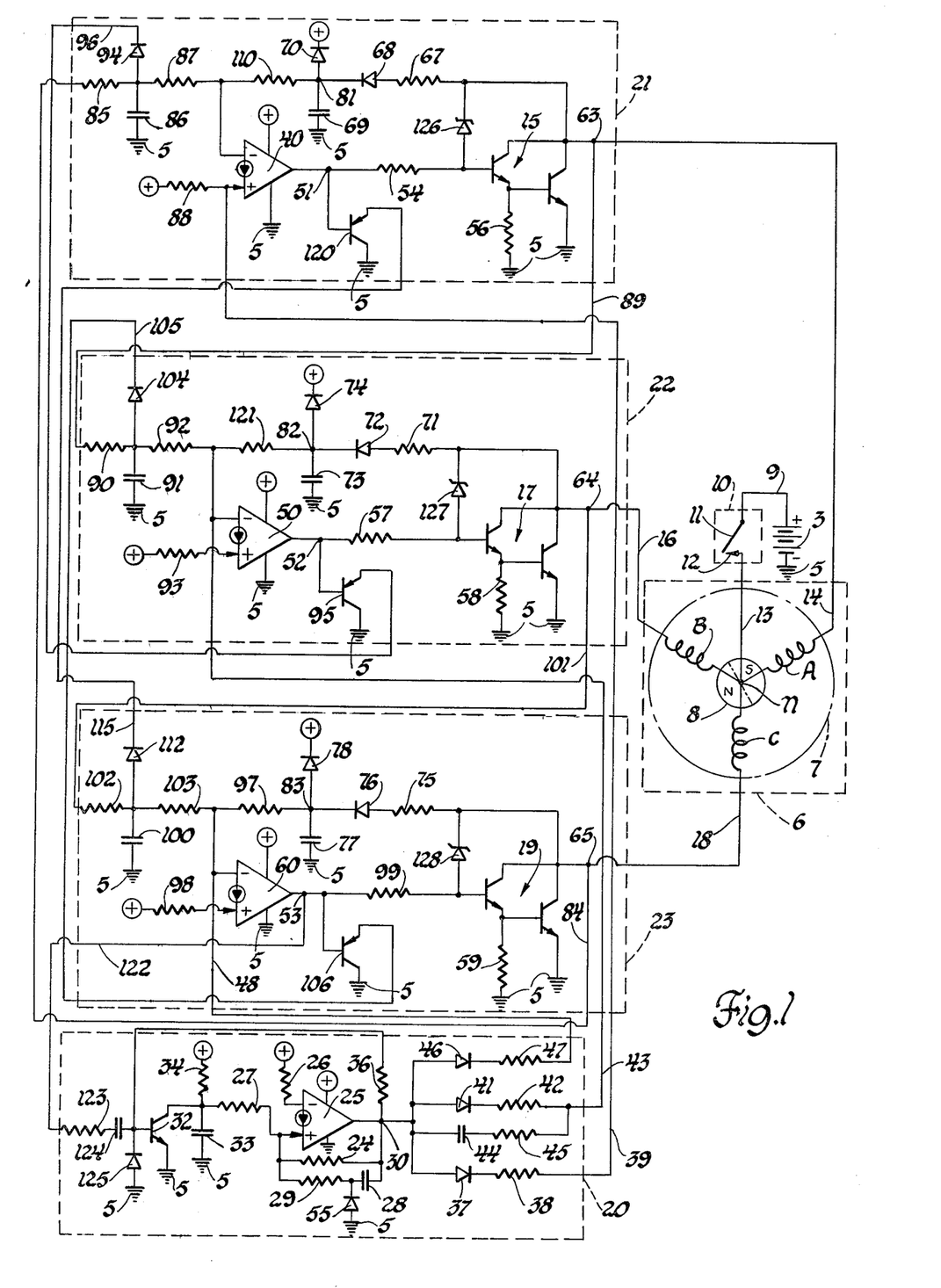
FIG. 1 sets forth the commutatorless direct current motor drive system of this invention in schematic form.

As point of reference or ground potential is the same point electrically throughout the system, it is illustrated in FIG. 1 by the accepted schematic symbol and referenced by the numeral 5.

The supply potential source may be a conventional storage battery 3 or any other suitable direct current potential source having current and voltage capabilities consistent with the requirements of the application. In the interest of reducing the complexity of FIG. 1 of the drawing, specific connections between battery 3 and various portions of the system that require operating potential have not been shown. It is to be specifically understood, however, that, upon the application of operating potential, all of the points of the system identified by a plus sign within a circle are connected to the positive polarity output terminal of battery 3 or any other direct current potential source that may be employed having direct current output voltage and current ratings consistent with the operating potential requirements of the circuitry of FIG. 1.

The commutatorless direct current motor drive system of this invention employs four operational amplifier circuits. In an actual embodiment, the operational amplifier circuits employed are of the Norton type such as those marketed commercially by the National Semiconductor Corporation under the designation LM3900. As these operational amplifier circuits may be commercially available items well known in the art and, per se, form no part of this invention, each has been illustrated in FIG. 1 of the drawing by the accepted schematic symbol for Norton type operational amplifiers. Furthermore, the Notron type operational amplifier circuit is only an example of an operational amplifier circuit suitable for use with the system of this invention, consequently, there is no intention or inference of a limitation thereto as other circuit elements having similar electrical characteristics may be substituted therefor without departing from the spirit of the invention. Whereas the conventional operational amplifier circuit differences input voltages, the Norton type operational amplifier circuit differences input currents. Therefore, large valued external input resistors are employed to convert from input voltages to input currents. Briefly, the Norton type operational amplifier circuit operates in such a manner that when current flow into the plus (+) input terminal is of a magnitude greater than that flowing into the minus (−) input terminal, the output signal of the device rises to a magnitude substantially equal to supply potential and when current flow into the minus (−) intput terminal is of a magnitude greater than that flowing into the plus (+) input terminal, the output signal of the device goes to substantially ground potential.

The commutatorless direct current motor 6 includes a polyphase stator 7 having three stator phase windings A, B and C and a permanent magnet rotor 8 magnetized across the diameter thereof with north and south magnetic poles. The motor illustrated in FIG. 1 is of the two-pole permanent magnet rotor type having a three-phase stator with one terminal end of each of the three stator phase windings connected to a common node N. The permanent magnet rotor 8 is arranged to be rotated in magnetic coupling relationship with the stator phase windings A, B and C whereby upon rotor 8 rotation, the rotor 8 magnetic field induces alternating current potential waveforms in the stator phase windings A, B and C that are phase displaced from each other by the number of electrical degrees determined by the number of stator phases. With a three-phase stator as illustrated in FIG. 1, these induced alternating current potential waveforms are phase displaced from each other by 120 electrical degrees.

The supply potential source, battery 3 may be applied across and disconnected from the commutatorless direct current motor drive system of this invention by a single pole-single throw electrical switch 10 having a movable contact 11 and a stationary contact 12 or any other suitable electrical switching device.

In a manner later to be explained, stator phase windings A, B, and C may be individually energized by an applied supply potential source such as battery 3 through respective individual stator phase winding energizing circuits, each of which is arranged for connection across an external supply potential source. The energizing circuit for stator phase winding A includes lead 9, movable contact 11 and stationary contact 12 of switch 10, lead 13, node N, stator phase winding A, lead 14, the current carrying elements of NPN transistor Darlington pair 15 and point of reference or ground potential 5. The energizing circuit for stator phase winding B includes lead 9, movable contact 11 and stationary contact 12 of switch 10, lead 13, node N, stator phase winding B, lead 16, the current carrying elements of NPN transistor Darlington pair 17 and point of reference or ground potential 5. The energizing circuit for stator phase winding C includes lead 9, movable contact 11 and stationary contact 12 of switch 10, lead 13, node N, stator phase winding C, lead 18, the current carrying elements of NPN transistor Darlington pair 19 and point of reference or ground potential 5. These energizing circuits are arranged for connection across an external supply potential source through lead 9 and switch 10 and through point of reference or ground potential 5.

The commutatorless direct current motor drive system of this invention is composed of one start circuit including the circuitry set forth within dashed-line rectangle 20 that is active only at or near zero permanent magnet rotor 8 rotational speed for initiating rotor 8 rotation from standstill whereby the phase displaced potential waveforms are initially induced in the stator phase windings A, B and C and three identical commutation circuits, each including the circuitry set forth within respective dashed-line rectangles 21, 22 and 23. In a manner to be later brought out in detail, the commutation circuits 21, 22 and 23 are responsive to the phase displaced potential waveforms induced in stator phase windings A, B and C for sustaining rotor 8 rotation by sequentially completing and later interrupting the respective hereinabove-described individual stator phase winding energizing circuits. Each of commutation circuits 21, 22 and 23 corresponds to a respective stator phase winding A, B and C and each is operational to effect the completion of the stator phase winding energizing circuit for the stator phase winding to which it corresponds in response to each negative going portion of the potential waveform induced in that stator phase winding and to effect the interruption of this energizing circuit in response to a predetermined potential level during a positive going portion of the potential waveform induced in another one of the stator phase windings whereby, after initiation of rotor 8 rotation from standstill by start circuit 20, the stator phase windings A, B and C are sequentially energized and later deenergized in response to the phase displaced alternating current potential waveforms induced in the stator phase windings A, B and C to produce a rotating magnetic field that sustains rotor 8 rotation.

Referring to the start circuit 20, the circuit combination including Norton operational amplifier circuit 25, input resistors 26 and 27 and the feedback network including the parallel combination of resistor 24 and series connected capacitor 28 and resistor 29 comprise a conventional monostable multivibrator circuit. As is well known in the art, the monostable multivibrator circuit normally operates in a stable state; may be triggered to an alternate state for a predetermined duration of time as established by an associated timing network and spontaneously returns to the original stable state upon the termination of the predetermined time duration. As the minus (−) input terminal of Norton operational amplifier circuit 25 is connected to the positive polarity output terminal of the supply potential source through input resistor 26, the output signal of Norton amplifier circuit 25 upon junction 30 is substantially ground potential while this monostable multivibrator circuit is in the normal stable state. Upon the initial application of supply potential by electrically closing movable contact 11 of switch 10 to stationary contact 12, all of the capacitors of the circuit are discharged, consequently, an arbitrary phase winding A, B or C is generally energized and NPN transistor 32 is not conductive. With NPN transistor 32 not conducting, capacitor 33 charges across the supply potential source through charging resistor 34. When capacitor 33 has charged to a direct current potential level of a magnitude sufficient to supply more current through input resistor 27 to the plus (+) input terminal of Norton operational amplifier circuit 25 than is supplied by the supply potential source to the minus (−) input terminal thereof through input resistor 26, the monostable multivibrator circuit is triggered to the alternate state in which the output signal thereof upon junction 30 rises to a potential level approximately two diode drops less than that of the supply potential. While the monostable multivibrator circuit is in the alternate state, the output direct current potential signal pulse upon junction 30 supplies base-emitter drive current to NPN transistor 32 through resistor 36. This drive current triggers NPN transistor 32 conductive through the collector-emitter electrodes to discharge capacitor 33. Additionally, the monostable multivibrator circuit output signal pulse upon junction 30 is applied to and supplies current through diode 37, resistor 38 and lead 39 to the plus (+) input terminal of Norton operational amplifier circuit 40 of commutation circuit 21; supplies current through diode 41, resistor 42 and lead 43 to the minus (−) input terminal of Norton operational amplifier circuit 50 of commutation circuit 22; supplies charge current for capacitor 44 through charging resistor 45 and supplies current through diode 46, resistor 47 and lead 48 to the minus (−) input terminal of Norton operational amplifier circuit 60 of commutation circuit 23. The flow of current through diode 37, resistor 38 and lead 39 into the plus (+) input terminal of Norton operational amplifier circuit 40 forces the triggering of this device to the condition in which the output signal thereof upon junction 51 is of a level substantially equal to supply potential; the flow of current through diode 41, resistor 42 and lead 43 into the minus (−) input terminal of Norton operational amplifier circuit 50 forces the triggering of this device to the condition in which the output signal thereof upon junction 52 is substantially ground potential; the flow of current through diode 46, resistor 47 and lead 48 into the minus (−) input terminal of Norton operational amplifier circuit 60 forces the triggering of this device to the condition in which the output signal thereof upon junction 53 is substantially ground potential and the flow of charge current through capacitor 44 and resistor 45 charges capacitor 44 to a potential level equal to approximately two diode drops less than that of the supply potential with the junction between capacitor 44 and resistor 45 being approximately one diode drop above ground potential. The positive polarity potential signal upon junction 51 of commutation circuit 21 supplies base-emitter drive current through resistor 54 to the NPN transistor Darlington pair 15 including an emitter resistor 56 to trigger this NPN transistor Darlington pair conductive through the current carrying elements thereof. Upon the conduction of NPN transistor Darlington pair 15, the previously described stator phase winding A energizing circuit is completed and may be traced from the positive polarity output terminal of battery 3, through lead 9, closed contacts 11 and 12 of switch 10, node N, phase winding A, lead 14, the current carrying elements of NPN transistor Darlington pair 15 and point of reference or ground potential 5 to the negative polarity output terminal of battery 3. As substantially ground potential is present upon junctions 52 and 53, the individual energizing circuits for phase windings B and C are not completed at this time, consequently, these phase windings are not energized. While the monostable multivibrator circuit of start circuit 20 is in the alternate state, rotor 8 aligns with the magnetic field produced by energized stator phase winding A and settles in this aligned position. Therefore, the duration of time that the monostable multivibrator circuit of start circuit 20 remains in the alternate state is determined by the period of time necessary for rotor 8 to align with the magnetic field produced by energized stator phase winding A. In the actual embodiment, this time period is of the order of 0.3 of a second. At the conclusion of the timing period as determined by the RC time constant of timing capacitor 28 and resistor 29 in the feedback circuit of Norton operational amplifier circuit 25 of the monostable multivibrator circuit of start circuit 20, this monostable multivibrator circuit spontaneously reverts to the stable condition of operation in which the output signal thereof upon junction 30 is of substantially ground potential. With a substantially ground potential signal upon junction 30, timing capacitor 28 discharges through diode 55 to reset start circuit 20. As the potential across capacitor 44 can not change instantaneously when the signal upon junction 30 goes to substantially ground potential, the potential upon the junction between capacitor 44 and resistor 45 goes negative by an amount equal to the reduction in potential upon junction 30. For example, with a 12 volt direct current supply potential source, the potential upon junction 30 is of the order of 11 volts and the potential upon the junction between capacitor 44 and resistor 45 is of the order of 0.5 volt while the monostable multivibrator circuit of start circuit 20 is in the alternate state. When this monostable multivibrator circuit reverts to the stable state, the potential upon junction 30 goes from 11 volts to approximately 0.5 volt and the potential upon the junction between capacitor 44 and resistor 45 goes to the order of negative 10.5 volts. As a consequence, current is drawn from the minus (−) input terminal of Norton operational amplifier circuit 50 of commutation circuit 22 through lead 43 and resistor 45 into capacitor 44 to discharge this device. The duration of this signal pulse is established by the RC time constant of resistor 45 and capacitor 44 and is applied to the minus (−) input terminal of Norton operational amplifier circuit 50. As a result of this flow of current out of the minus (−) input terminal of Norton operational amplifier circuit 50, this device abruptly switches to the condition in which the output signal thereof upon junction 52 is of a magnitude substantially equal to supply potential. This positive polarity potential signal upon junction 52 supplies base-emitter drive current through resistor 57 to the NPN transistor Darlington pair 17 including an emitter resistor 58 to trigger this NPN transistor Darlington pair conductive through the current carrying elements thereof. Upon the conduction of NPN transistor Darlington pair 17, the previously described stator phase winding B energizing circuit is completed and may be traced from the positive polarity output terminal of battery 3, through lead 9, closed contacts 11 and 12 of switch 10, node N, stator phase winding B, lead 16, the current carrying elements of NPN transistor Darlington pair 17 and point of reference or ground potential 5 to the negative polarity output terminal of battery 3. Upon the energization of stator phase winding B, the resultant magnetic field produced by energized stator phase windings A and B is to the left, as viewing FIG. 1, of that produced by energized stator phase winding A. This shift of stator magnetic field initiates rotation of rotor 8 in a counterclockwise direction at a speed greater than the minimum commutation speed. Start circuit 20, therefore, effects the initiation of rotor 8 rotation from standstill at a speed greater than minimum commutation speed. For a start of rotor 8 rotation in a clockwise direction, the energization of stator phase winding C rather than stator phase winding B may be forced after rotor 8 has aligned with the magnetic field produced by energized stator phase winding A. This may be effected by connecting the combination of series connected capacitor 44 and resistor 45 to the minus (−) input terminal of Norton operational amplifier circuit 60 of commutation circuit 23. As will be brought out later is this specification, the system of this invention operates to sustain rotor 8 rotation after the initiation of rotor 8 rotation from standstill.

From the foregoing description, it is apparent that start circuit 20 includes a monostable multivibrator circuit that produces a first electrical output signal pulse of a predetermined duration as established by the RC time constant of timing capacitor 28 and resistor 29 upon the application of supply potential and a capacitor 44 and a resistor 45 that produces a second opposite polarity electrical output signal pulse of a predetermined duration as established by the RC time constant of capacitor 44 and resistor 45 upon the termination of the first output signal pulse. In a manner to be later explained, start circuit 20 is disabled while rotor 8 rotation is sustained by the operation of the system of this invention.

While rotor 8 is rotating, the magnetic field of rotating rotor 8 induces alternating current potential waveforms in stator phase windings A, B and C that are phase displaced from each other by 120 electrical degrees and are superimposed upon the direct current potential level of the supply potential source as illustrated by the curve of FIG. 2A wherein the supply potential source potential level is referenced by the notation B+. These induced potential waveforms are of a frequency and amplitude directly proportional to the rotational speed of rotor 8. However, in a manner to be later explained, the NPN transistor Darlington pairs 15, 17 and 19 are conductive part of the time and not conductive part of the time. While NPN transistor Darlington pair 15 is not conductive, the potential level upon junction 63 is substantially equal to the sum of the alternating current potential waveform induced in stator phase winding A by the rotor 8 magnetic field and the potential level of the supply potential source and while NPN transistor Darlington pair 15 is conductive, the potential level upon junction 63 is substantially ground, as illustrated by the curve of FIG. 2B. While NPN transistor Darlington pair 17 is not conductive, the potential level upon junction 64 is substantially equal to the sum of the alternating current potential waveform induced in stator phase winding B by the rotor 8 magnetic field and the potential level of the supply potential source and while NPN transistor Darlington pair 17 is conductive, the potential level upon junction 64 is substantially ground, as illustrated by the curve of FIG. 2C. While NPN transistor Darlington pair 19 is not conductive, the potential level upon junction 65 is substantially equal to the sum of the alternating current potential waveform induced in stator phase winding C by the rotor 8 magnetic field and the potential level of the supply potential source and while NPN transistor Darlington pair 19 is conductive, the potential level upon junction 65 is substantially ground, as illustrated by the curve of FIG. 2D.

Commutation of NPN transistor Darlington pairs 15, 17 and 19 is achieved by sensing the potential level of the stator phase windings A, B and C. This commutation is effected by commutation circuits 21, 22 and 23 that are responsive to the phase displaced potential waveforms that are induced in stator phase windings A, B and C by the rotating magnetic field of rotor 8. The potential level of stator phase winding A appears upon junction 63 and is filtered by resistor 67, diode 68, capacitor 69 and diode 70. The potential level of stator phase winding B appears upon junction 64 and is filtered by resistor 71, diode 72, capacitor 73 and diode 74. The potential level of stator phase winding C appears upon junction 65 and is filtered by resistor 75, diode 76, capacitor 77 and diode 78. In addition, it is the function of diodes 70, 74 and 78 to prevent the potential upon respective junctions 81, 82 and 83 from increasing to a potential level greater than one diode drop above the level of the supply potential. The combination of resistor 67, diode 68 and capacitor 69 functions as a voltage peak follower circuit whereby the charge upon capacitor 69 follows the change of potential level upon junction 63; the combination of resistor 71, diode 72 and capacitor 73 functions as a voltage peak follower circuit whereby the charge upon capacitor 73 follows the change of potential level upon junction 64; and the combination of resistor 75, diode 76 and capacitor 77 functions as a voltage peak follower circuit whereby the charge upon capacitor 77 follows the change of potential level upon junction 65.

Figure 2:
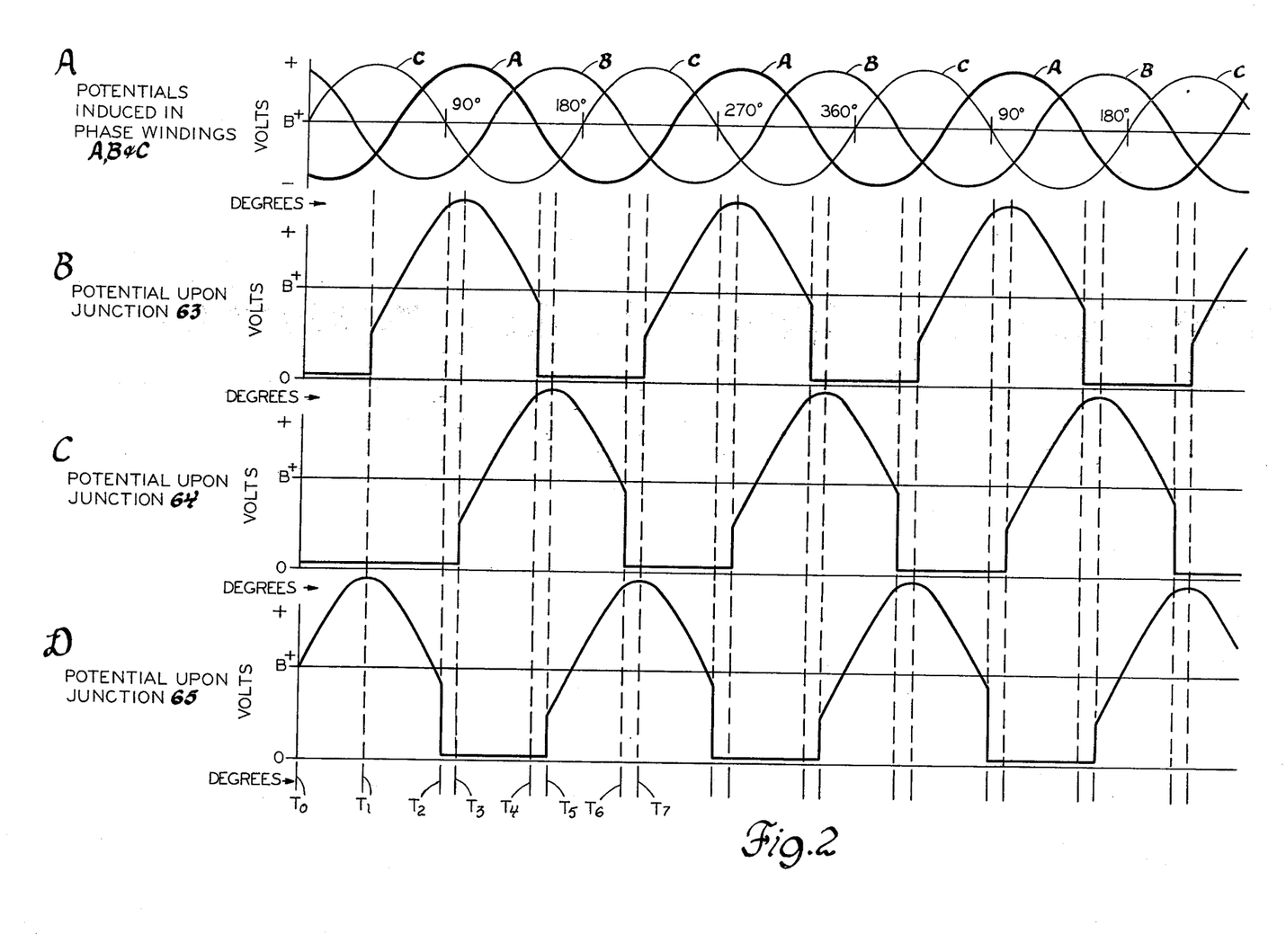
FIG. 2 is a set of curves useful in understanding the operation of the circuit of FIG. 1.

In each of the curves of FIG. 2, the supply potential level is referenced by the notation B+. Referring to FIG. 2, upon the initiation at time $T_o$ of rotor 8 rotation in a counterclockwise direction at a speed greater than the minimum commutation speed in a manner hereinabove explained with reference to start circuit 20, the potential level upon each of junctions 63 and 64 is substantially ground, as illustrated by respective curves 2B and 2C, for the reason that both NPN transistor Darlington pairs 15 and 17 are conductive through the current carrying elements thereof and the potential upon junction 65 is of substantially supply potential for the reason that transistor Darlington pair 19 is not conductive through the current carrying elements thereof, as illustrated by curve 2D.

As rotor 8 rotates between times $T_o$ and $T_1$ of FIG. 2, the signal upon each of junctions 63 and 64 remains at substantially ground potential, as illustrated by respective curves 2B and 2C, and the alternating current potential waveform induced in phase winding C by the magnetic field of rotating rotor 8 increases in a positive going direction from the supply potential level and appears upon junction 65, as illustrated by curve 2D. This increasing potential upon junction 65 charges capacitor 86 of commutation circuit 21 through lead 84 and resistor 85. When, at time $T_1$, capacitor 86 has charged to a direct current potential level of a magnitude sufficient to supply more current through input resistor 87 to the minus (−) input terminal of Norton operational amplifier circuit 40 than is supplied to the plus (+) input terminal thereof through input resistor 88 from the positive polarity output terminal of the supply potential source, Norton operational amplifier circuit 40 is abruptly triggered to the condition in which the output signal thereof upon junction 51 is of substantially ground potential. With a substantially ground potential signal upon junction 51, NPN transistor Darlington pair 15 is triggered not conductive to interrupt the previously described stator phase winding A energizing circuit. Upon the interruption of this energizing circuit, the alternating current potential waveform induced in phase winding A by the magnetic field of rotating rotor 8 is superimposed upon the direct current supply potential and appears upon junction 63, as illustrated by the curve 2B.

As rotor 8 rotates between times $T_1$ and $T_2$, the alternating current potential waveform induced in phase winding A by the magnetic field of rotating rotor 8 that appears upon junction 63 passes through B+ from a negative to a positive polarity direction and further increases in a positive going direction toward the maximum positive polarity level, as illustrated by curve 2B; the signal upon junction 64 remains at substantially ground potential as NPN transistor Darlington pair 17 is still conductive, as illustrated by curve 2C; and the alternating current potential waveform induced in phase winding C by the magnetic field of rotating rotor 8 that appears upon junction 65 increases to and passes through the maximum positive polarity level and decreases in a negative going direction through B+, as illustrated by curve 2D. The potential waveform upon junction 65 is followed by a corresponding charge upon capacitor 77. When, at time $T_2$, the charge upon capacitor 77 has decreased to a direct current potential level of a magnitude that is insufficient to supply more current through input resistor 97 to the minus (−) input terminal of Norton operatonal amplifier circuit 60 than is supplied to the plus (+) input terminal thereof through input resistor 98 from the positive polarity output terminal of the supply potential source, Norton operational amplifier circuit 60 is abruptly triggered to the condition in which the output signal thereof upon junction 53 is of a positive polarity potential level substantially equal to the supply potential level. This positive polarity potential signal upon junction 53 supplies base-emitter drive current through resistor 99 to NPN transistor Darlington pair 19, including an emitter resistor 59, to trigger this transistor Darlington pair conductive through the current carrying elements thereof to complete the previously described stator phase winding C energizing circuit and the potential signal upon junction 65 goes to substantially ground potential, as illustrated by curve 2D.

As rotor 8 rotates between times $T_2$ and $T_3$, the alternating current potential waveform induced in phase winding A by the magnetic field of rotating rotor 8 that appears upon junction 63 continues to increase in a positive going direction toward the maximum positive polarity level, as illustrated by curve 2B; the signal upon junction 64 remains at substantially ground potential as NPN transistor Darlington pair 17 is still conductive, as illustrated by curve 2C; and the signal upon junction 65 remains at substantially ground potential as NPN transistor Darlington pair 19 is still conductive, as illustrated by curve 2D. The increasing potential level upon junction 63 between times $T_2$ and $T_3$ charges capacitor 91 of commutation circuit 22 through lead 89 and resistor 90. When, at time $T_3$, capacitor 91 has charged to a direct current potential level of a magnitude sufficient to supply more current through input resistor 92 to the minus (−) input terminal of Norton operational amplifier circuit 50 than is supplied to the plus (+) input terminal thereof through input resistor 93 from the positive polarity output terminal of the supply potential source, Norton operational amplifier circuit 50 is abruptly triggered to the condition in which the output signal thereof upon junction 52 is of substantially ground potential. With a substantially ground potential signal upon junction 52, NPN transistor Darlington pair 17 is triggered not conductive to interrupt the previously described stator phase winding B energizing circuit and capacitor 86 of commutation circuit 21 discharges through diode 94, lead 96 and the emitter-collector electrodes of PNP transistor 95. Upon the interruption of the stator phase winding B energizing circuit, the alternating current potential waveform induced in phase winding B by the magnetic field of rotating rotor 8 is superimposed upon the direct current supply potential and appears upon junction 64, as illustrated by curve 2C.

As rotor 8 rotates between times $T_3$ and $T_4$, the alternating current potential waveform induced in phase winding B by the magnetic field of rotating rotor 8 that appears upon junction 64 passes through B+ from a negative to a positive polarity direction and further increases in a positive going direction toward the maximum positive polarity level, as illustrated by curve 2C; the signal upon junction 65 remains at substantially ground potential as NPN transistor Darlington pair 19 is still conductive, as illustrated by curve 2D; and the alternating current potential waveform induced in phase winding A by the magnetic field of rotating rotor 8 that appears upon junction 63 increases to and passes through the maximum positive polarity level and decreases in a negative going direction through B+, as illustrated by curve 2B. The potential waveform upon junction 63 is followed by a corresponding charge upon capacitor 69. When, at time $T_4$, the charge upon capacitor 69 has decreased to a direct current potential level of a magnitude that is insufficient to supply more current through input resistor 110 to the minus (−) input terminal of Norton operatonal amplifier circuit 40 than is supplied to the plus (+) input terminal thereof through input resistor 88 from the positive polarity output terminal of the supply potential source, Norton operational amplifier circuit 40 is abruptly triggered to the condition in which the output signal thereof upon junction 51 is of a positive polarity potential level substantially equal to the supply potential level. This positive polarity potential signal upon junction 51 supplies base-emitter drive current through resistor 54 to NPN transistor Darlington pair 15 to trigger this transistor Darlington pair conductive through the current carrying elements thereof to complete the previously described stator phase winding A energizing circuit and the potential signal upon junction 63 goes to substantially ground potential, as illustrated by curve 2B.

As rotor 8 rotates between times $T_4$ and $T_5$, the alternating current potential waveform induced in phase winding B by the magnetic field of rotating rotor 8 that appears upon junction 64 continues to increase in a positive going direction toward the maximum positive polarity level, as illustrated by curve 2C; the signal upon junction 65 remains at substantially ground potential as NPN transistor Darlington pair 19 is still conductive, as illustrated by curve 2D; and the signal upon junction 63 remains at substantially ground potential as NPN transistor Darlington pair 15 is still conductive, as illustrated by curve 2B. The increasing potential level upon junction 64 between times $T_4$ and $T_5$ charges capacitor 100 of commutation circuit 23 through lead 101 and resistor 102. When, at time $T_5$, capacitor 100 has charged to a direct current potential level of a magnitude sufficient to supply more current through input resistor 103 to the minus (−) input terminal of Norton operational amplifier circuit 60 than is supplied to the plus (+) input terminal thereof through input resistor 98 from the positive polarity output terminal of the supply potential source, Norton operational amplifier circuit 60 is abruptly triggered to the condition in which the output signal thereof upon junction 53 is of substantially ground potential. With a substantially ground potential signal upon junction 53, NPN transistor Darlington pair 19 is triggered not conductive to interrupt the previously described stator phase winding C energizing circuit and capacitor 91 of commutation circuit 22 discharges through diode 104, lead 105 and the emitter-collector electrodes of PNP transistor 106. Upon the interruption of the stator phase winding C energizing circuit, the alternating current potential waveform induced in phase winding C by the magnetic field of rotating rotor 8 is superimposed upon the direct current supply potential and appears upon junction 65, as illustrated by curve 2D.

As rotor 8 rotates between times $T_5$ and $T_6$, the alternating current potential waveform induced in phase winding C by the magnetic field of rotating rotor 8 that appears upon junction 65 passes through B+ from a negative to a positive polarity direction and further increases in a positive going direction toward the maximum positive polarity level, as illustrated by curve 2D; the signal upon junction 63 remains at substantially ground potential as NPN transistor Darlington pair 15 is still conductive, as illustrated by curve 2B; and the alternating current potential waveform induced in phase winding B by the magnetic field of rotating rotor 8 that appears upon junction 54 increases to and passes through the maximum positive polarity level and decreases in a negative going direction through B+, as illustrated by curve 2C. The potential waveform upon junction 64 is followed by a corresponding charge upon capacitor 73. When, at time $T_6$, the charge upon capacitor 73 has decreased to a direct current potential level of a magnitude that is insufficient to supply more current through input resistor 121 to the minus (−) input terminal of Norton operational amplifier circuit 50 than is supplied to the plus (+) input terminal thereof through input resistor 93 from the positive polarity output terminal of the supply potential source, Norton operational amplifier circuit 50 is abruptly triggered to the condition in which the output signal thereof upon junction 52 is of a positive polarity potential level substantially equal to the supply potential level. This positive polarity potential signal upon junction 52 supplies base-emitter drive current through resistor 57 to NPN transistor Darlington pair 17 to trigger this transistor Darlington pair conductive through the current carrying elements thereof to complete the previously described stator phase winding B energizing circuit and the potential signal upon junction 64 goes to substantially ground potential, as illustrated by curve 2C.

As rotor 8 rotates between times $T_6$ and $T_7$, the alternating current potential waveform induced in phase winding C by the magnetic field of rotating rotor 8 that appears upon junction 65 continues to increase in a positive going direction toward the maximum positive polarity level, as illustrated by curve 2D; the signal upon junction 63 remains at substantially ground potential as NPN transistor Darlington pair 15 is still conductive, as illustrated by curve 2B; and the signal upon junction 64 remains at substantially ground potential as NPN transistor Darlington pair 17 is still conductive, as illustrated by curve 2C. The increasing potential level upon junction 65 between times $T_6$ and $T_7$ charges capacitor 86 of commutation circuit 21 through lead 84 and resistor 85. When, at time $T_7$, capacitor 86 has charged to a direct current potential level of a magnitude sufficient to supply more current through input resistor 87 to the minus (−) input terminal of Norton operational amplifier circuit 40 than is supplied to the plus (+) input terminal thereof through input resistor 88 from the positive polarity output terminal of the supply potential source, Norton operational amplifier circuit 40 is abruptly triggered to the condition in which the output signal thereof upon junction 51 is of substantially ground potential. With a substantially ground potential signal upon junction 51, NPN transistor Darlington pair 15 is triggered not conductive to interrupt the previously described stator phase winding A energizing circuit and capacitor 100 of commutation circuit 23 discharges through diode 112, lead 115 and the emitter-collector electrodes of PNP transistor 120. Upon the interruption of the stator phase winding A energizing circuit, the alternating current potential waveform induced in phase winding A by the magnetic field of rotating rotor 8 is superimposed upon the direct current supply potential and appears upon junction 63, as illustrated by curve 2B.

The cycle of events just described repeats so long as the application of supply potential is maintained through switch 10. Referring to FIG. 2, after initial rotor start from standstill and beginning with time $T_2$, stator phase winding C, stator phase winding A and stator phase winding B are sequentially energized in that order repeatedly. This sequential stator phase winding energization produces a rotating magnetic field in a manner well known in the art that sustains rotor rotation. For rotor rotation in the opposite direction, the sequence of stator phase winding energization would be reversed by reversing the connection of the terminal end opposite node N of any two of leads 14, 16 and 18.

It is apparent from the foregoing description that each of commutation circuits 21, 22 and 23 corresponds to a respective stator phase winding A, B and C and that these commutation circuits are responsive to the alternating current phase displaced potential waveforms induced in stator phase windings A, B and C for sustaining rotor 8 rotation after initial start from standstill by sequentially completing and later interrupting the respective individual stator phase winding energizing circuits that results in a rotating magnetic field.

Each of commutation circuits 21, 22 and 23 includes a Norton operational amplifier circuit and an NPN transistor Darlington pair. Each combination of Norton operational amplifier circuit 40 and NPN transistor Darlington pair 15 of commutation circuit 21, Norton operation amplifier circuit 50 and NPN transistor Darlington pair 17 of commutation circuit 22 and Norton operational amplifier circuit 60 and NPN transistor Darlington pair 19 is an electrically operable switching arrangement that is capable of being operated to first and second operating conditions in response to the application thereto of electrical signals of a value less than and greater than a predetermined magnitude and is effective to complete and interrupt the stator phase winding to which each corresponds when in the first and second operating conditions, respectively. The switch point of each is determined by the supply potential level and the ohmic value of respective input resistors 88, 93 and 98 that determines the predetermined magnitude that the applied electrical signals must be less than and greater than. When the electrical signal applied to these switching arrangements is of a level less than the predetermined magnitude, the applied electrical signal supplies less current to the minus (−) input terminal of the Norton operational amplifier circuit than is supplied to the plus (+) input terminal, consequently, the switching arrangement is triggered to the operating condition in which the stator phase winding energizing circuit for the stator phase winding to which it corresponds is completed and when the applied electrical signal is of a level greater than the predetermined magnitude, the applied signal supplies more current into the minus (−) input terminal of the Norton operational amplifier circuit than is supplied to the plus (+) input terminal, consequently, the switching arrangement is triggered to the operating condition in which the stator phase winding energizing circuit for the stator phase winding to which it corresponds is interrupted. The potential waveform induced in stator phase winding A is applied to the minus (−) input terminal of Norton operational amplifier circuit 40 of the corresponding switching arrangement through resistor 67, diode 68, capacitor 69 and resistor 110. The potential waveform induced in stator phase winding B is applied to the minus (−) input terminal of Norton operational amplifier circuit 50 of the corresponding switching arrangement through resistor 71, diode 72, capacitor 73 and resistor 121. The potential waveform induced in stator phase winding C is applied to the minus (−) input terminal of Norton operational amplifier circuit 60 of the corresponding switching arrangement through resistor 75, diode 76, capacitor 77 and resistor 97. The potential waveform induced in stator phase winding A is applied to the minus (−) input terminal of Norton operational amplifier circuit 50 of the switching arrangement that corresponds to another stator phase winding B through lead 89, resistor 90, capacitor 91 and resistor 92. The potential waveform induced in stator phase winding B is applied to the minus (−) input terminal of Norton operational amplifier circuit 60 of the switching arrangement that corresponds to another stator phase winding C through lead 101, resistor 102, capacitor 100 and resistor 103. The potential waveform induced in stator phase winding C is applied to the minus (−) input terminal of Norton operational amplifier circuit 40 of the switching arrangement that corresponds to another stator phase winding A through lead 84, resistor 85, capacitor 86 and resistor 87.

The combination of resistor 85 and capacitor 86 of commutation circuit 21 delays the application of the potential waveform induced in stator phase winding C to the minus (−) input terminal of Norton operational amplifier circuit 40 of commutation circuit 21; the combination of resistor 90 and capacitor 91 delays the application of the potential waveform induced in stator phase winding A to the minus (−) input terminal of Norton operational amplifier circuit 50 of commutation circuit 22 and the combination of resistor 102 and capacitor 100 delays the application of the potential waveform induced in stator phase winding B to the minus (−) input terminal of Norton operational amplifier circuit 60 of commutation circuit 23. By changing the delay introduced by these circuits, the period of conduction of each of NPN transistor Darlington pairs 15, 17 and 19 may be selected. As a result of the delay introduced by these resistor-capacitor combinations, each stator phase winding is deenergized at a time after the next stator phase winding in the sequence is energized as determined by this delay. These resistor-capacitor combinations are so designed that each of capacitors 86, 91 and 100 charge through respective resistors 85, 90 and 102 at a rate that increases with the amplitude of the potential waveform induced in the respective stator phase winding to which each is connected. Consequently, these resistor-capacitor combinations introduce a variable delay that is determined by the motor speed, the lower the motor speed, the longer the delay period, and vice versa.

In a manner hereinabove explained in detail, while the drive system of this invention is sustaining rotor 8 rotation in response to the phase displaced potential waveforms induced in stator phase windings A, B and C, Norton operational amplifier circuit 60 is triggered to the condition in which the output signal thereof upon junction 53 is of a positive polarity and of a magnitude substantially equal to supply potential during each negative half cycle of the potential waveform induced in stator phase winding C and is triggered to the condition in which the output signal thereof is substantially ground potential during each positive half cycle of the potential waveform induced in stator phase winding C. This signal is applied through lead 122, resistor 123 and coupling capacitor 124 to the base electrode of NPN transistor 32. While this signal is of a positive polarity, base-emitter drive current is supplied thereby to NPN transistor 32 to trigger this device conductive through the collector-emitter electrodes to provide a discharge path for capacitor 33 during each negative half cycle of the potential waveform induced in stator phase winding C. While this signal is of ground potential, coupling capacitor 124 discharges through diode 125. The RC time constant of capacitor 33 and charging resistor 34 is so arranged that capacitor 33 does not charge to a sufficient potential level to effect the triggering of Norton operational amplifier circuit 25 between successive negative polarity half cycles of the potential waveform induced in phase winding C. Therefore, so long as the system of this invention is sustaining rotor rotation in response to the potential waveforms induced in the stator phase windings, start circuit 20 is maintained disabled. Zener diodes 126, 127 and 128 protect respective NPN transistor Darlington pairs against possibly destructive high voltage transients.

While a preferred embodiment of the present invention has been shown and described, it will be obvious to those skilled in the art that various modifications and substitutions may be made without departing from the spirit of the invention which is to be limited only within the scope of the appended claims.

The embodiments of the invention in which an exclusive property or privilege is claimed are defined as follows:

1. A commutatorless direct current motor drive system for use with direct current motors of the type having a stator including a plurality of phase windings that may be individually energized by an applied supply potential through respective individual stator phase winding energizing circuits arranged for electrical connection across an external supply potential source and a permanent magnet rotor arranged to be rotated in magnetic coupling relationship with the stator phase windings whereby upon rotor rotation, the rotor magnetic field induces alternating current potential waveforms in the stator phase windings that are phase displaced from each other by the number of electrical degrees determined by the number of stator phases, comprising:

means for initiating rotor rotation from standstill whereby said phase displaced potential waveforms are initially induced in said stator phase windings;

means connected to said external supply potential source for producing a reference signal; and means responsive to said phase displaced potential waveforms induced in said stator phase windings for sustaining rotor rotation by sequentially completing and later interrupting said respective individual stator phase winding energizing circuits, said means including switching means connected to each said stator phase winding for effecting the completion of the said stator phase winding energizing circuit for the said stator phase winding to which it is connected in response to each negative going portion of the said potential waveform induced in that stator phase winding attaining a level that has a predetermined relationship to said reference signal and for effecting the interruption of this energizing circuit in response to a predetermined potential level of the said potential waveform induced in another one of said stator phase windings whereby, after initiation of rotor rotation from standstill, said stator phase windings may be sequentially energized and later deenergized in response to said phase displaced potential waveforms induced in said stator phase windings to produce a rotating magnetic field that sustains rotor rotation.

2. A commutatorless direct current motor drive system for use with direct current motors of the type having a stator including a plurality of phase windings that may be individually energized by an applied supply potential through respective individual stator phase winding energizing circuits arranged for electrical connection across an external supply potential source and a permanent magnet rotor arranged to be rotated in magnetic coupling relationship with the stator phase windings whereby upon rotor rotation, the rotor magnetic field induces alternating current potential waveforms in the stator phase windings that are phase displaced from each other by the number of electrical degrees determined by the number of stator phases comprising:

means for initiating rotor rotation from standstill whereby said phase displaced potential waveforms are initially induced in said stator phase windings;

means connected to said external supply potential source for producing a reference signal;

an electrically operable switching arrangement connected to each of said stator phase windings that is capable of being operated to first and second operating conditions in response to the application thereto of electrical signals of a value less than and greater than that of said reference signal and being effective to complete and interrupt the said stator phase winding energizing circuit for the said stator phase winding to which it is connected when in said first and second operating conditions, respectively;

means for applying the said potential waveform induced in each of said stator phase windings to the said switching arrangement connected thereto for actuating the said switching arrangement to the operating condition in which the completion of the said stator phase winding energizing circuit for the said stator phase winding to which said switching arrangement is connected is effected during each negative going portion of the induced potential waveform; and means for applying the said potential waveform induced in each of said stator phase windings to a said switching arrangement that is connected to another said stator phase winding for actuating the said switching arrangement to which it is applied to the operating condition in which the interruption of the said stator phase winding energizing circuit for the stator phase winding to which said switching arrangement is connected is effected during each positive going portion of the induced potential waveform whereby, after initiation of rotor rotation from standstill, said stator phase windings may be sequentially energized and later deenergized in response to said phase displaced potential waveforms induced in said stator phase windings to produce a rotating magnetic field that sustains rotor rotation.

3. A commutatorless direct current motor drive system for use with direct current motors of the type having a stator including a plurality of phase windings that may be individually energized by an applied supply potential through respective individual stator phase winding energizing circuits arranged for electrical connection across an external supply potential source and a permanent magnet rotor arranged to be rotated in magnetic coupling relationship with the stator phase windings whereby upon rotor rotation, the rotor magnetic field induces alternating current potential waveforms in the stator phase windings that are phase displaced from each other by the number of electrical degrees determined by the number of stator phases comprising:

means for initiating rotor rotation from standstill whereby said phase displaced potential waveforms are initially induced in said stator phase windings;

means connected to said external supply potential source for producing a reference signal;

an electrically operable switching arrangement connected to each of said stator phase windings that is capable of being operated to first and second operating conditions in response to the application thereto of respective electrical signals of a value less than and greater than that of said reference signal and being effective to complete and interrupt the said stator phase winding energizing circuit for the said stator phase winding to which it is connected when in said first and second operating conditions, respectively;

means for applying the said potential waveform induced in each of said stator phase windings to the said switching arrangement connected thereto for actuating the said switching arrangement to the operating condition in which the completion of the said stator phase winding energizing circuit for the said stator phase winding to which said switching arrangement is connected is effected during each negative going portion of the induced potential waveform; and means including variable delay circuit means for applying the said potential waveform induced in each of said stator phase windings to a said switching arrangement that is connected to another said stator phase winding for actuating the said switching arrangement to which it is applied to the operating condition in which the interruption of the said stator phase winding energizing circuit for the stator phase winding to which said switching arrangement is connected is effected during each positive going portion of the induced potential waveform whereby, after initiation of rotor rotation from standstill, said stator phase windings may be sequentially energized and later deenergized in response to said phase displaced potential waveforms induced in said stator phase windings to produce a rotating magnetic field that sustains rotor rotation.

4. A commutatorless direct current motor drive system for use with direct current motors of the type having a stator including a plurality of phase windings that may be individually energized by an applied supply potential through respective individual stator phase winding energizing circuits arranged for electrical connection across an external supply potential source and a permanent magnet rotor arranged to be rotated in magnetic coupling relationship with the stator phase windings whereby upon rotor rotation, the rotor magnetic field induces alternating current potential waveforms in the stator phase windings that are phase displaced from each other by the number of electrical degrees determined by the number of stator phases comprising:

means for initiatiating rotor rotation from standstill whereby said phase displaced potential waveforms are initially induced in said stator phase windings, said means including means for producing a first electrical signal pulse of a predetermined duration upon the application of supply potential and a second opposite polarity electrical signal pulse of a predetermined duration upon the termination of said first output signal pulse;

means connected to said external supply potential source for producing a reference signal;

an electrically operable switching arrangement connected to each of said stator phase windings that is capable of being operated to first and second operating conditions in response to the application thereto of respective electrical signals of a value less than and greater than that of said reference signal and being effective to complete and interrupt the said stator phase winding energizing circuit for the said stator phase winding to which it is connected when in said first and second operating conditions, respectively;

means for applying said first output signal pulse of said rotor rotation initiating means to a selected one of said switching arrangements in such a manner as to operate said switching arrangement to the operating condition in which it is effective to complete the said phase winding energizing circuit for the said phase winding to which it is connected and to each other one of said switching arrangements in such a manner as to operate these said switching arrangements to the operating condition in which each is effective to interrupt the said stator phase winding energizing circuit for the said stator phase winding to which it is connected;

means for applying said second output signal pulse of said rotor rotation initiating means to another selected one of said switching arrangements in such a manner as to operate said switching arrangement to the operating condition in which it is effective to complete the said phase winding energizing circuit for the said phase winding to which it is connected to initiate rotor rotation;

means for applying the said potential waveform induced in each of said stator phase windings to the said switching arrangement connected thereto for actuating the said switching arrangement to the operating condition in which the completion of the said stator phase winding energizing circuit for the said stator phase winding to which said switching arrangement is connected is effected during each negative going portion of the induced potential waveform;

means for applying the said potential waveform induced in each of said stator phase windings to a said switching arrangement that is conneted to another said stator phase winding for actuating the said switching arrangement to which it is applied to the operating condition in which the interruption of the said stator phase winding energizing circuit for the stator phase winding to which said switching arrangement is connected is effected during each positive going portion of the induced potential waveform whereby, after initiation of rotor rotation from standstill, said stator phase windings may be sequentially energized and later deenergized in response to said phase displaced potential waveforms induced in said stator phase windings to produce a rotating magnetic field that sustains rotor rotation; and means for disabling said rotor rotation initiating means while said rotor is rotating in response to said phase displaced potential waveforms.

5. A commutatorless direct current motor drive system for use with direct current motors of the type having a stator including a plurality of phase windings that may be individually energized by an applied supply potential through respective individual stator phase winding energizing circuits arranged for electrical connection across an external supply potential source and a permanent magnet rotor arranged to be rotated in magnetic coupling relationship with the stator phase windings whereby upon rotor rotation, the rotor magnetic field induces alternating current potential waveforms in the stator phase windings that are phase displaced from each other by the number of electrical degrees determined by the number of stator phases comprising:

means for initiating rotor rotation from standstill whereby said phase displaced potential waveforms are initially induced in said stator phase windings;

means connected to said external supply potential source for producing a reference signal;

means responsive to said phase displaced potential waveforms induced in said stator phase windings for sustaining rotor rotation by sequentially completing and later interrupting said respective individual stator phase winding energizing circuits, said means including switching means connected to each said stator phase winding and means for applying to the said switching means connected to any said stator phase winding both the said potential waveform induced in the said stator phase winding to which said switching means is connected and the said potential waveform induced in another said stator phase winding with said switching means being so arranged as to be operative to effect the completion of the said stator phase winding energizing circuit for the said stator phase winding to which it is connected in response to each negative going portion of the said potential waveform induced in that stator phase winding attaining a level that has a predetermined relationship to said reference signal and to effect the interruption of this energizing circuit in response to a predetermined potential level during each positive going portion of the said potential waveform induced in said another said stator phase winding whereby, after initiation of rotor rotation from standstill, said stator phase windings may be sequentially energized and later deenergized in response to said phase displaced potential waveforms induced in said stator phase windings to produce a rotating magnetic field that sustains rotor rotation; and means for disabling said rotor rotation initiating means while said rotor is rotating in response to said phase displaced potential waveforms.

* * * * *

UNITED STATES PATENT AND TRADEMARK OFFICE
CERTIFICATE OF CORRECTION

PATENT NO. : 4,262,236
DATED : April 14, 1981
INVENTOR(S) : Robert B. Gelenius, Robert H. Wind It is certified that error appears in the above-identified patent and that said Letters Patent are hereby corrected as shown below:

In the references, include U.S. Patent No. 4,156,168 Vogel, May 22, 1979, Class 318, Subclass 138.

Column 2, line 34, "Notron" should read -- Norton --.

Column 2, line 52, "intput" should read -- input --.

Column 10, line 63, "junction 54" should read -- junction 64 --.

Column 17, line 43, "conneted" should read -- connected --.

Signed and Sealed this

Twentieth Day of October 1981

[SEAL]

Attest:

GERALD J. MOSSINGHOFF

*Attesting Officer*  *Commissioner of Patents and Trademarks*